United States Patent
Gifford et al.

(10) Patent No.: US 7,433,434 B2
(45) Date of Patent: Oct. 7, 2008

(54) COMMUNICATION CHANNEL TRACKING APPARATUS

(75) Inventors: Carl Steven Gifford, Gilbert, AZ (US); John Eric Kleider, Atlanta, GA (US); Chad Scott Bergstrom, Chandler, AZ (US); Jeffery Scott Chuprun, Scottsdale, AZ (US); Bruce Alan Fette, Mesa, AZ (US)

(73) Assignee: General Dynamics C4 Systems, Inc., Scottsdale, AZ (US)

( * ) Notice: Subject to any disclaimer, the term of this patent is extended or adjusted under 35 U.S.C. 154(b) by 652 days.

(21) Appl. No.: 10/956,658

(22) Filed: Oct. 1, 2004

(65) Prior Publication Data

US 2006/0072692 A1 Apr. 6, 2006

(51) Int. Cl.
*H04B 1/10* (2006.01)
(52) U.S. Cl. ...................................... 375/350; 375/349
(58) Field of Classification Search ................. 375/144, 375/148, 260, 267, 346, 347, 348, 349, 350, 375/224, 340
See application file for complete search history.

(56) References Cited

U.S. PATENT DOCUMENTS

| | | | |
|---|---|---|---|
| 4,022,974 A | 5/1977 | Kohut et al. | |
| 4,389,540 A | 6/1983 | Nakamura et al. | |
| 4,621,356 A | 11/1986 | Scipione | |
| 6,151,487 A * | 11/2000 | Kim et al. | 455/134 |
| 6,330,294 B1 | 12/2001 | Ansbro et al. | |
| 6,351,499 B1 * | 2/2002 | Paulraj et al. | 375/267 |
| 6,662,024 B2 | 12/2003 | Walton et al. | |
| 6,873,606 B2 * | 3/2005 | Agrawal et al. | 370/310 |
| 6,888,809 B1 * | 5/2005 | Foschini et al. | 370/334 |
| 6,917,821 B2 * | 7/2005 | Kadous et al. | 455/562.1 |
| 7,116,652 B2 * | 10/2006 | Lozano | 370/334 |
| 7,167,507 B2 * | 1/2007 | Mailaender et al. | 375/148 |
| 2003/0076797 A1 * | 4/2003 | Lozano | 370/334 |
| 2003/0076908 A1 * | 4/2003 | Huang et al. | 375/350 |
| 2004/0001426 A1 * | 1/2004 | Mailaender et al. | 370/203 |
| 2005/0147079 A1 * | 7/2005 | Lakkis | 370/350 |
| 2005/0265490 A1 * | 12/2005 | Sestok et al. | 375/340 |

OTHER PUBLICATIONS

Paolo Prandoni and Martin Vetterli (An FIR Cascade Structure for Adaptive Linear Prediction, IEEE Transactions on Signal Processing, col. 46, No. 9 Sep. 1998.*

(Continued)

*Primary Examiner*—Jean B Corrielus
(74) *Attorney, Agent, or Firm*—Ingrassia Fisher & Lorenz, P.C.

(57) ABSTRACT

Apparatus are provided for a communication signal processing apparatus having a channel estimator configured to generate a first channel estimation at a first time point, a linear predictor coupled to the channel estimator, and an adaptive filter coupled with the linear predictor. The linear predictor is configured to predict a second channel estimation based on a second time point and a channel frequency. The second time point is concurrent or subsequent to the first time point. The second channel estimation includes a first coefficient. The linear predictor includes a first predictor having a sample time point. The first predictor is configured to generate the first coefficient of the second channel estimation based on the sample time point and the second time point. The sample time point is prior to the second time point. The adaptive filter is configured to recursively determine the second channel estimation.

8 Claims, 8 Drawing Sheets

OTHER PUBLICATIONS

Clayton Scott and Rob Nowak, Introduction to Adaptive Filtering, The Connexions Project, Version 1.5, May 19, 2004.*

Lee-Min Lee and Hsiao-Chuan Wang, An Extended Levinson-Durbin Algorithm for the Analysis of Noisy Autoregressive Process, IEEE Signal Processing Letters, vol. 3, No. 1, Jan. 1996.*

Dennis R. Morgan, and Samuel E. Craig, Real-Time Adaptive Linear Prediction Using the Least Mean Square Gradient Algorithm, IEEE Transactions on Acoustics, Speech, and Signal Processing, Dec. 1976, pp. 494-507, vol. ASSP-24, No. 6.

Wei Xing Zheng, Adaptive Linear Prediction of Autoregressive Models in the Presence of Noise, Proceedings of ICSP2000, 2000, p. 555-558.

Paolo Prandoni and Martin Vetterli, An FIR Cascade Structure for Adaptive Linear Prediction, IEEE Transactions on Signal Processing, Sep. 1998, p. 2566-2571, vol. 46, No. 9.

* cited by examiner

COMMUNICATION CHANNEL TRACKING APPARATUS

GOVERNMENT LICENSE RIGHTS

The U.S. Government may have certain rights to some or all of the inventive subject matter of the present application as provided for by the terms of contract No. DAAD19-01-2-0011 awarded by the Department of the Army.

FIELD OF THE INVENTION

The present invention generally relates to communication systems, and more particularly relates to channel tracking in mobile communication systems.

BACKGROUND OF THE INVENTION

Radio frequency (RF) spectrum is a scarce resource for wireless or mobile communication systems. Wireless communication systems have been used to provide communication of voice, data, and the like for a number of users. These systems may be based on code division multiple access (CDMA), time division multiple access (TDMA), frequency division multiple access (FDMA), and other multiple access techniques. In a cellular or personal communications systems environment, an increasing number of users need to be simultaneously serviced while also attempting to avoid interference among such users.

One attempt at addressing dwindling communication spectral resources is the application of multiple-input multiple-output (MIMO) techniques to achieve desirable spectral efficiencies. Recent research has shown that a rich scattering environment is capable of significant communication capacity due to multipath diversity inherent in the rich scattering environment. MIMO techniques have been used in communication systems that generally employ multiple transmit antennas and multiple receive antenna for transmission of multiple independent data streams. These data streams may be transmitted to one or more terminals. For example, a multiple access communication system having a base station with multiple antennas may concurrently communicate with a number of terminals via a channel matrix.

Most forms of MIMO systems require a reliable estimate of the channel matrix for reception of communication signals. Some MIMO systems use successive interference cancellation techniques to remove effects from undesired transmit channels. One method for channel estimation is the use of training preambles that consist of known data at a MIMO transmitter and receiver. The channel is estimated periodically when a training period occurs. The computed channel estimate is then used without modification for following communication. For example, one signal processing technique that may be used with MIMO communication systems is an orthogonal frequency division multiplexing (OFDM) technique. OFDM distributes data over a large number of carriers that are each spaced apart by frequencies that provide the orthogonality. In this example, the channel estimate is used for OFDM frames following the training preamble until a new training period updates the channel estimate.

The training preambles or sequences help to capture a current channel estimate at a specific point in time. Mobile communication systems exhibit a time and frequency selective channel. Under mobile conditions where the channel is dynamically changing, the channel estimate for each OFDM frame typically incurs some error that may result in the degradation of the MIMO communication system. If only training preambles are employed, the number of applicable OFDM frames that follow the training preambles is generally lesser because the channel estimate may become "stale" within a relatively short amount of time. Communication algorithms such as MIMO generally require knowledge of the communication channel to perform well. Channel tracking may be employed to assist in improving OFDM-MIMO performance.

Pilot based tracking algorithms are common, but share in overhead loss with training preambles. A common difficulty associated with tracking an OFDM-MIMO channel is that the multiple transmit signals create self-interference at a receiver. One approach to minimize this interference is the application of successive interference cancellation to clean-up a received signal. One method used to track a communication channel is decision directed (DD) channel estimation. DD algorithms typically require little to no communication overhead since each subcarrier is treated as its own pilot to obtain a high-resolution channel estimate. However, bit errors tend to degrade the performance of such systems using DD channel estimation.

In view of the foregoing, it is desirable to provide a channel tracker for a time-frequency channel having improved communication channel estimation. In addition, it is desirable to provide a receiver having communication channel tracking to track a time-frequency channel of advance communication algorithms. Furthermore, additional desirable features provided by the invention will become apparent to one skilled in the art from the drawings, foregoing background, following detailed description, and appended claims.

BRIEF SUMMARY

Apparatus are provided for communication signal processing using adaptive linear prediction. In a first exemplary embodiment, a communication signal processing apparatus has a channel estimator configured to generate a first channel estimation at a first time point, a linear predictor coupled to the channel estimator, and an adaptive filter coupled with the linear predictor. The linear predictor is configured to predict a second channel estimation based on a second time point and a channel frequency. The second time point is concurrent or subsequent to the first time point. The second channel estimation includes, but is not limited to, a first coefficient. The linear predictor includes, but is not limited to, a first predictor having a sample time point. The first predictor is configured to generate the first coefficient of the second channel estimation based on the sample time point and the second time point. The sample time point is prior to the second time point. The adaptive filter is configured to recursively determine the second channel estimation.

In second exemplary embodiment, a multiple-input multiple-output (MIMO) signal processor has channel estimator configured to generate a first channel estimation at a first time point, a linear predictor coupled to the channel estimator and configured to predict a second channel estimation based on a time sample and a channel frequency, and an adaptive filter coupled to the linear predictor and configured to recursively determine the second channel estimation. The second channel estimation is subsequent to the first channel estimation and based on $$\hat{h}_n = \sum_{p=1}^{P} -a_{p+1}\hat{h}_{n-p},$$

wherein $\hat{h}_n$ is a one step predictor for a channel at time sample n, P is a linear prediction order, and a is a linear prediction coefficient.

In a third exemplary embodiment, a radio receiver has an antenna configured to receive a communication signal, a down-converter coupled to the antenna and configured to demodulate the communication signal, and a channel tracker coupled to the down-converter. The channel tracker is configured to estimate a channel of the communication signal at a first frequency and a first time point. The channel tracker includes, but is not limited to, a channel estimator configured to generate a first channel estimate at the first frequency and the first time point, a linear predictor coupled to the channel estimator and configured to predict a second channel estimate at the first frequency and the first time point based on the first channel estimate, and an adaptive filter coupled to the linear predictor and the down-converter. The second channel estimate includes, but is not limited to, a first component having a first coefficient. The linear predictor includes, but is not limited to, a first predictor having a sample time point. The first predictor is configured to generate the first component of the second channel estimate based on the sample time point. The adaptive filter is configured to recursively generate the second channel estimate and transmit the second channel estimate to the down-converter.

BRIEF DESCRIPTION OF THE DRAWINGS

The present invention will hereinafter be described in conjunction with the following drawing figures, wherein like numerals denote like elements.

DETAILED DESCRIPTION

The following detailed description of the invention is merely exemplary in nature and is not intended to limit the invention or the application and uses of the invention. Furthermore, there is no intention to be bound by any theory presented in the preceding background of the invention or the following detailed description of the drawings.

Although a receiver and channel tracker are described hereinafter with regard to corresponding hardware that accomplishes signal processing functions, the receiver and channel tracker may alternatively utilize software, such as found in software defined radios, that encompass applications, routines, or other software modules to accomplish signal processing functions. Those of skill in the relevant art will appreciate that other variations of hardware, software, or any combination thereof may be implemented to accomplish the same functions such as programmable microprocessors or controllers. Additionally, although a receiver and a communication system are described hereinafter with regard to spread spectrum communication, such as using OFDM, a variety of communication techniques using different multiplexing or modulation schemes may also be used.

Figure 1:
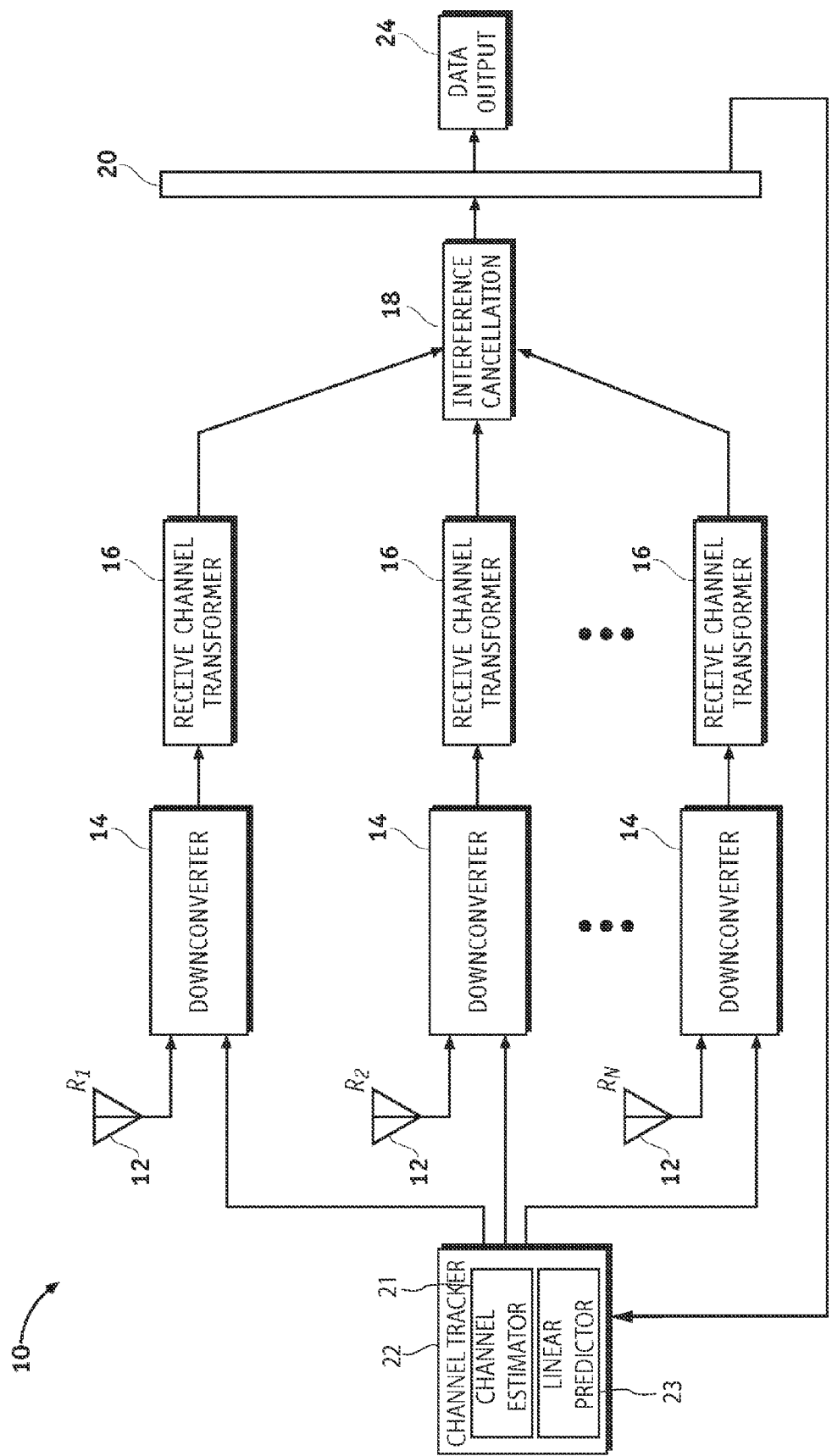
FIG. 1 is a block diagram showing a first exemplary embodiment of a radio receiver in accordance with the present invention.

Referring to the drawings, FIG. 1 is a block diagram illustrating a first exemplary embodiment of a radio receiver 10 in accordance with the present invention. It should be appreciated that the blocks of FIG. 1 (as well as the blocks in the other block diagrams disclosed herein) represent functional elements and are not intended to represent discrete hardware elements. For example, many of the functions illustrated in FIG. 1 can be implemented in a single processor unit. As previously mentioned hereinabove, the functions can be implemented with hardware, software, or a combination of hardware and software.

The receiver 10 includes N-multiple signal processing components that each receives an input communication signal, such as a sub-carrier in OFDM communication signals. In this exemplary embodiment, the receiver 10 includes multiple input antennas 12, a down converter 14 coupled to each antenna 12, a receive channel transformer 16 coupled to each down converter 14, an interference cancellation module 18 coupled to the channel transformers 16, a data bus 20 coupled to the interference cancellation module 18, a channel tracker 22 connected to the data bus 20, and a data output 24 connected to the data bus 20. The channel tracker 22 has a channel estimator 21 coupled to a linear predictor 23, as described in greater detail below. Although not specifically detailed in FIG. 1 and described herein, additional conventional receiver components may be included with the receiver 10 as will be appreciated by those of skill in the art. For example, a variety of demodulators/decoders and filters for different signal modulation and access methods may be coupled with the receiver 10 to produce a corresponding communication data output. The channel estimator 21 of the channel tracker 22 of the radio receiver 10 performs time-frequency channel estimation based on a received communication signal and the linear predictor 23 of the channel tracker 22 performs an application of adaptive linear prediction to predict a time-frequency channel several frames in the future.

Although this exemplary embodiment shows and describes a radio receiver, additional communication system components (not shown) may be combined with the receiver 10 including, but not limited to, a data source, a radio transmitter, and a transponder to implement a communication system.

The transmitter may have a modulation/coding unit that prepares a communication signal from data received from the data source and a transmit channel transformation processor that decomposes the signal using various channelization techniques. The modulation/coding unit applies modulation and/or coding to the data as is familiar to those of skill in the art. For example, the modulation/coding unit can apply source coding, channel coding, interleaving, and/or various forms of modulation to a data signal. In a spread spectrum system embodiment, the modulation/coding unit applies signal spreading to the signal using methods that are well known in the art, such as direct sequence and frequency hopping.

Additionally, the radio receiver 10 may be integrated within a radio to combine both the transmitter and receiver 10, or the transmitter and receiver 10 may be separate and individual components in such radio. In these communication systems, the data source delivers a data signal to the transmitter that processes the data and creates a transmit signal. The receiver receives transmitted signals and processes the signal to recover original data contained in the receive signal.

In an OFDM embodiment, the transmitter processes the flow of data by blocks and manages this flow by sequences of symbols. The sequences of symbols are transformed to produce sub-carriers that each carries a symbol. The receiver 10 receives communication signals from the transmitter as an OFDM block of symbols (e.g., a time-frequency block) via the antennas 12. The down-converter 14 converts the received communication signals to digital information for subsequent processing by the receive channel transformer 16. In one exemplary embodiment, the full satellite communication (SATCOM) spectrum is digitized and down-converted by the down-converter 14. Analog RF low noise amplification, pre-selection, down-conversion, and A/D sampling functions may also be performed by the down-converter 14. For example, a full satellite communication band, such as from the transponder, may be fed to a bandpass filter to remove extraneous signals and to reduce potential inter-modulation products that could cause interference within the receiver 10. This signal may then be passed through a low noise amplifier.

The channel transformer 16 converts the digitized communication signal, such as by Fourier transform or the like, to a data symbol form. The particular transformation method may vary depending on a selected multiple access technology or modulation technology employed with the communication signal. The interference cancellation module 18 reassembles the data symbols, such as in the form of sequences of symbols, and suppresses interference among the various sub-channels using a variety of interference mitigation methods. Successive interference cancellation (SIC) may be used to separate-out the original data symbols used for the input source data. In one exemplary embodiment, detection, demodulation, and interference mitigation of signal interference or other sub-band/sub-channel interferers may be conducted by the interference cancellation module 18. Doppler tracking and channel equalization are optionally performed depending on the type of interference cancellation techniques used.

As previously mentioned, a variety of interference mitigation methods are usable by the interference cancellation module 18 including but not limited to: interference prediction with inverse filtering of the interference; spectral self-normalization to suppress interfering spectral peaks; adaptive weighting; and, decision directed feedback cancellation. In decision directed feedback cancellation, legacy signals within each channel may be demodulated to identify and separate each signal, then re-modulated and inverse equalized out of phase with a stored receive signal to cancel them from the receive channel transformation process.

Figure 2:
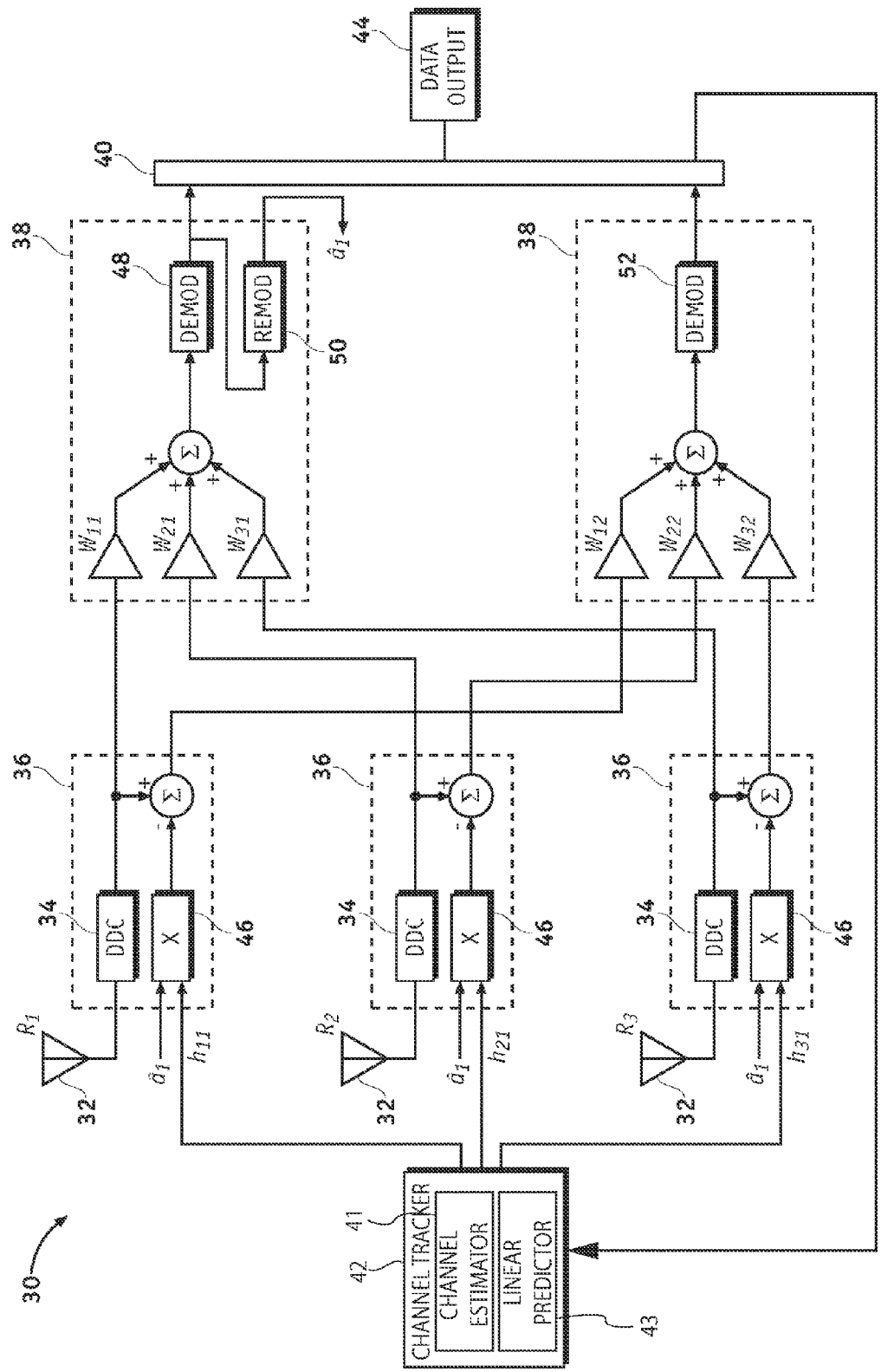
FIG. 2 is a block diagram showing a second exemplary embodiment of a radio receiver in accordance with the present invention.

FIG. 2 is a block diagram illustrating a second exemplary embodiment of a radio receiver, shown generally at 30, in accordance with the present invention. Although any number of multiple input signal processing components may be used, the receiver 30 is structured as a 3×2 communication system in the second exemplary embodiment for simplicity of explanation. In this exemplary embodiment, the receiver 30 includes three antennas 32 receiving input communication signals $R_1$, $R_2$, and $R_3$, respectively, and a down converter 36 coupled to each antenna 32. A receive channel transformer 38 is coupled to the down converters 36, a data bus 40 is coupled to the channel transformers 38, a channel tracker 42, which has a channel estimator 41 coupled to a linear predictor 43, is coupled to the data bus 40 and each down converter 36, and a data output 44 is coupled to the data bus 40.

In this exemplary embodiment, an input communication signal received by antenna 32 is digitized and down converted by digitizer down converter (DDC) 34, and an antenna array nulling signal, $w_1$, is applied to the digitized down converted signal in the receive channel transformer 38 to null out weaker transmitted signals received by the antennas 32. The receive channel transformer 38 includes a demodulator 48 and a remodulator 50. The demodulator 48 demodulates the received signal and outputs a data estimate, $d_1$. The remodulator 50 remodulates the data estimate $d_1$ and obtains a transmitter symbol estimate, $\hat{a}_1$.

The channel tracker 42 estimates a time-frequency channel, h, using channel information of time frames prior to the channel to be estimated. Based on the transmitter symbol estimate $\hat{a}_1$ and the estimated time-frequency channel h, SIC may be used to subtract out the stronger transmitted signal from each of the antennas 32. The receive vector for the weaker transmitted signal may be determined in the receive channel transformer 38. In this exemplary embodiment, the estimated time-frequency channel, $h_{11}$, $h_{21}$, and $h_{31}$, for each of the antennas 32 is provided to each of the signal multipliers 46 in the down converters 36 and multiplied with the transmitter symbol estimate $\hat{a}_1$. A spatial filter $w_2$ is applied to the receive vector in the receive channel transformer 38. The receive channel transformer 38 also includes a demodulator 52 that demodulates the filtered receive vector for the weaker transmitted signal to obtain a data estimate, $d_2$, for the same.

Figure 3:
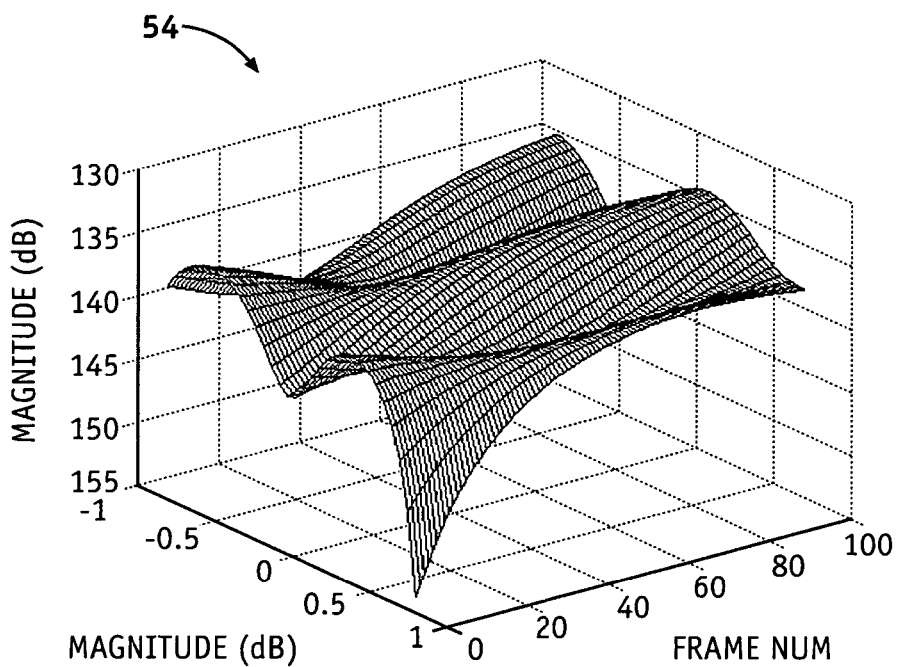
FIG. 3 is a graph showing an OFDM-MIMO communication channel.
Figure 4:
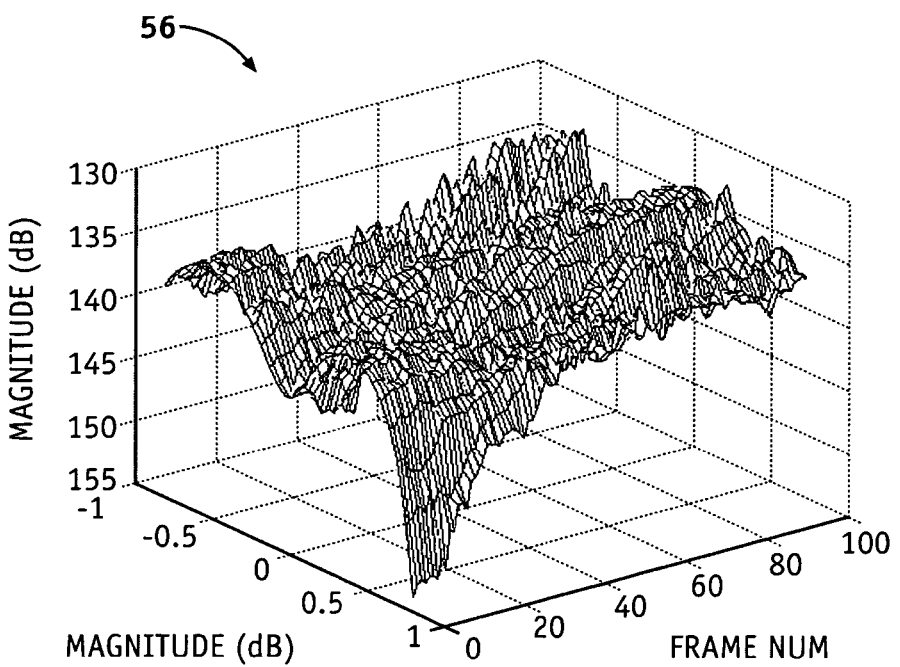
FIG. 4 is a graph showing a least mean squares (LMS) channel estimate of the OFDM-MIMO communication channel shown in FIG. 3.

FIG. 3 is a graph showing an OFDM-MIMO communication channel 54. The communication channel varies in magnitude and frequency per OFDM frame and has substantially smooth contours. FIG. 4 is a graph showing an LMS channel estimate 56 of the OFDM-MIMO communication channel shown 54 in FIG. 3. A comparison of the channel estimate 56 shown in FIG. 4 with the actual OFDM-MIMO communication channel 54 shows an influence of errors on the channel estimate 56. In particular, the channel estimate 56 lacks the smooth contours of the OFDM-MIMO communication channel 54. Although the channel estimate 56 is described with regard to LMS, other methods for channel estimation may be used including, but not limited to, least square (LS) estimate, recursive least square (RLS) estimate, and Kalman Filter estimate.

The LS estimate is a relatively simple method to estimate the channel and is performed on a frame by frame basis typically without filtering of the estimate. The LS estimate may be represented by:

$$\hat{h}_{i+1} = (\hat{s}_i)^{-1} \hat{y}_i$$

where a future channel state, $\tilde{h}_{i+1}$, is a function of a current channel state, $\tilde{h}_i$, $\hat{s}_i$ is an estimated transmit symbol, and $\hat{y}_i$ is an estimated receive signal.

The aforementioned adaptive LMS estimate may be represented by two equations:

$$e_i = y_i - \hat{s}_i \tilde{h}_i$$

$$\tilde{h}_{i+1} = \tilde{h}_i + \mu \hat{s}_i^* e_i$$

where $e_i$ is an estimation error and $\mu$ is an adaptive step-size. The tracking performance and stability of the LMS estimate is generally dependent on the adaptive step-size, $\mu(0<\mu<1)$. If $\mu$ is smaller, the LMS estimate will generally adapt more slowly. If $\mu$ is larger, the LMS estimate will generally be unstable and not converge. An optimum value of $\mu$ is $1/\lambda_{max}$ where $\lambda_{max}$ is the maximum eigenvalue of an input covariance matrix.

The RLS estimate is generally more complex than the LMS estimate and uses a method of exponentially weighted least squares to minimize a cost function. The RLS estimate may be represented as follows:

Initialize:
$P_0 = \delta^{-1}$, where $\delta$ is small positive constant,
$h_{i0}$ is a value obtained from training $$k_i = P_{i-1}\hat{s}_i(\lambda + \hat{s}_i^H P_{i-1}\hat{s}_i)^{-1}$$

$$e_i = y_i - \hat{s}_i \hat{h}_{i-1}^H$$

$$\hat{h}_i = \hat{h}_{i-1} + k_i e_i^*$$

$$P_i = \frac{1}{\lambda}(P_{i-1} - k_i \hat{s}_i^H P_{i-1})$$

where $k_i$ is a gain vector, $P_i$ is the inverse of an input covariance matrix, and $\lambda$ is a forgetting factor, $0<\lambda<1$, such that $\lambda=1$ represents remember all past results. The RLS algorithm may use a matrix inversion lemma, also known as Woodbury's identity, to reduce computation complexity.

The Kalman filter generally uses state-space concepts to recursively solve a minimum mean-squared estimation problem by estimating a state of a discrete-time controlled process that is governed by a linear stochastic difference equation as a function of an observed measurement. The Kalman filter estimate includes a recursive prediction of a next state and a state correction due to an observation. The Kalman tracking filter is generally more complex than the RLS estimate and converges more quickly than the RLS estimate. The Kalman filter estimate may be represented as follows:

Initialize:
$P_0 = \delta^{-1}$, where $\delta$ is small positive constant,
$h_{i0}$ is a value obtained from training Kalman Prediction:

$$\tilde{h}_i = A\tilde{h}_{i-1}$$

$$P_i = AP_{i-1}A^T + Q$$

Kalman Correction:

$$k_i = P_{i-1}\hat{s}_i^T(\hat{s}_i^T P_{i-1}\hat{s}_i + R)^{-1}$$

$$\tilde{h}_i = \tilde{h}_{i-1} + k_i(y_i - \hat{s}_i^T \tilde{h}_{i-1})$$

$$P_i = P_{i-1} - k_i \hat{s}_i^T P_{i-1}$$

where A is a state transition matrix, $P_i$ is an estimate error covariance matrix (i.e., $E[e_i e_i^T]$), Q is a process noise covariance matrix with a normal probability $N(0,Q)$, R is a measurement noise covariance matrix equal to $\sigma_w^2$ with a normal probability $N(0,R)$, and $k_i$ is a gain or blending factor. The observation in this channel tracking case is $y_i$.

Figure 5:
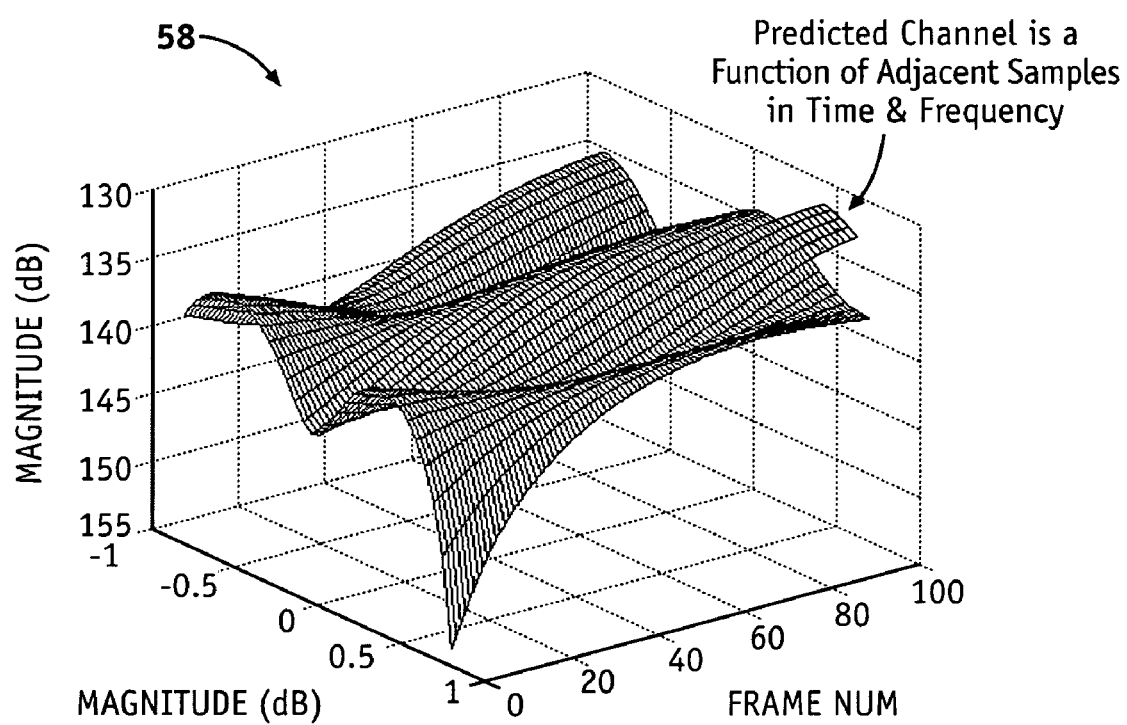
FIG. 5 is a graph showing an exemplary embodiment of a channel prediction of the OFDM-MIMO communication channel shown in FIG. 3.

FIG. 5 is a graph showing an exemplary embodiment of a channel prediction 58 of the OFDM-MIMO communication channel 54 shown in FIG. 3. In a more simplistic exemplary embodiment, prediction of the communication channel 54, as may be accomplished by the channel tracker 22, 42 shown in FIGS. 1 and 2, respectively, at future time points is accomplished based on samples of substantially adjacent time points and frequencies. Although the predicted communication channel 58 is described as a function of adjacent samples in time and frequency, non-adjacent samples in time and frequency (e.g., multiple steps ahead in time) may also be used for channel prediction as described in greater detail hereinbelow.

Figure 6:
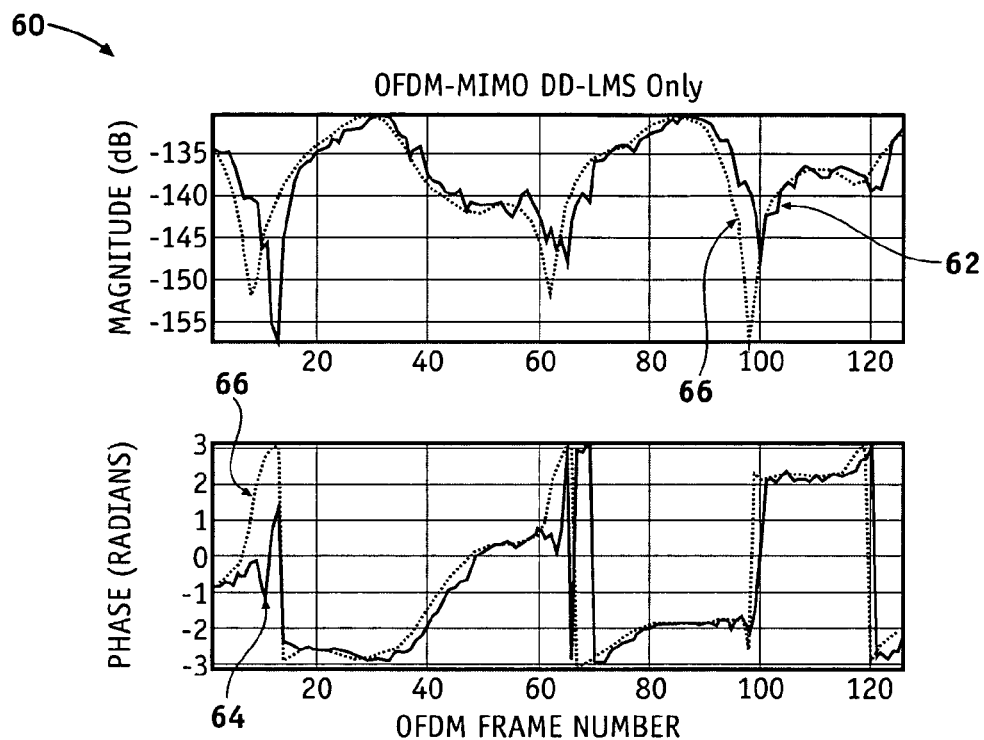
FIG. 6 is a graph showing a decision directed (DD) LMS channel estimate of an OFDM-MIMO communication signal.
Figure 7:
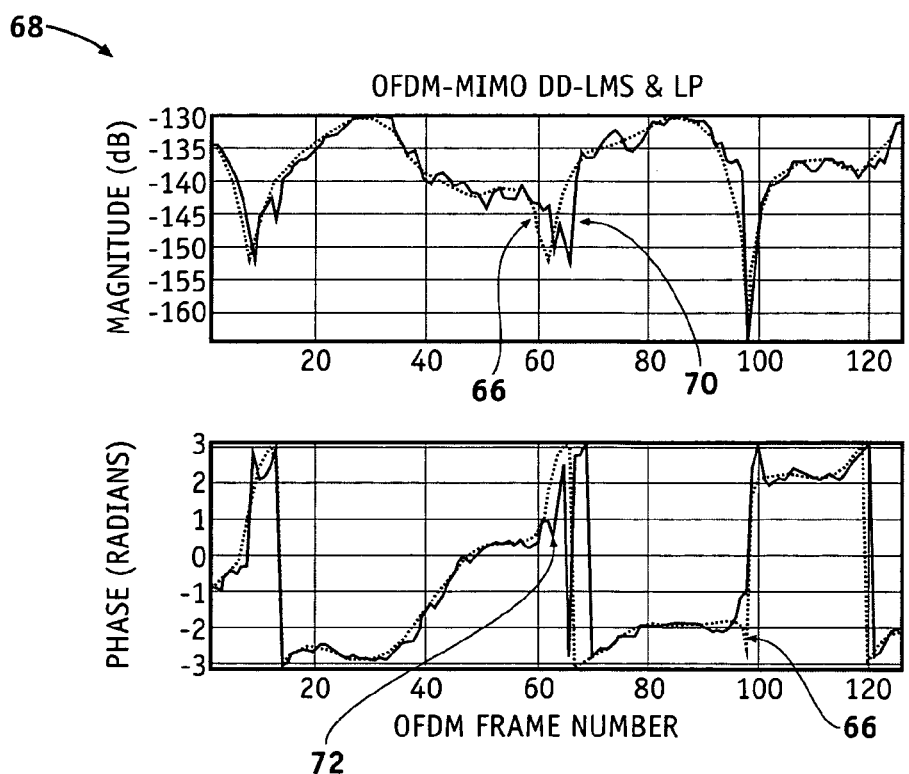
FIG. 7 is a graph showing a DD-LMS channel estimate with linear prediction (LP) in accordance with an exemplary embodiment.

FIG. 6 is a graph showing a decision directed (DD) LMS channel estimate 60 of an OFDM-MIMO communication signal. The DD-LMS channel estimate 60 is represented by a magnitude 62 and a phase 64 that follow an actual representation of a communication channel 66. FIG. 7 is a graph showing a DD-LMS channel estimate with linear prediction (LP) 68 in accordance with an exemplary embodiment. The DD-LMS channel estimate with LP 68, such as may be performed by the channel tracker 22, 42 shown in FIGS. 1 and 2, respectively, is represented by a magnitude 70 and a phase 72 that follow the communication channel 66 shown in FIG. 6. A comparison of the DD-LMS channel estimate 60 (FIG. 6) with the DD-LMS channel estimate with LP 68 reveals that the DD-LMS channel estimate with LP more closely tracks the magnitude and phase of the actual communication channel 66.

Figure 8:
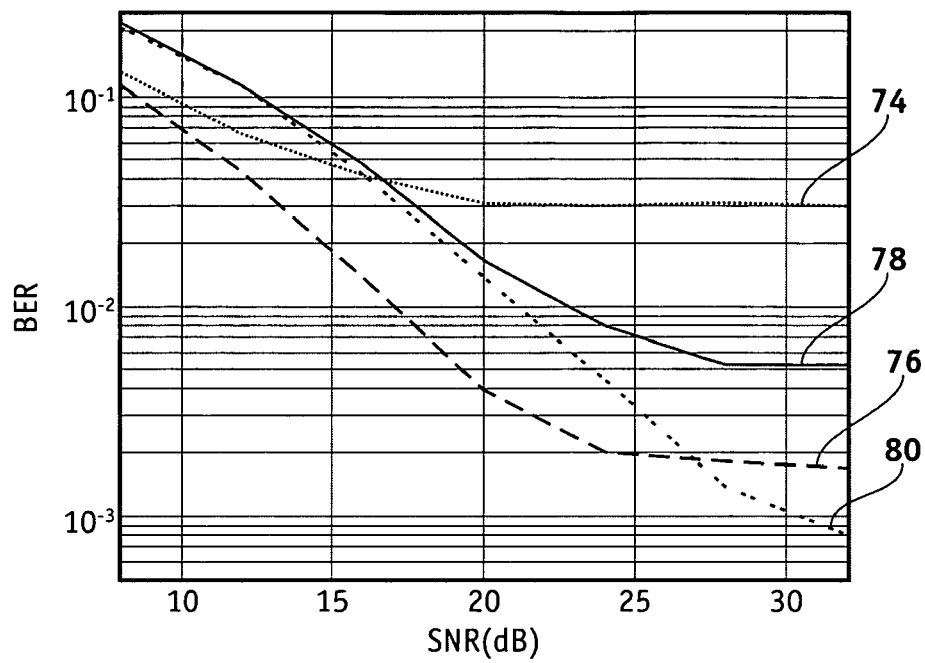
FIG. 8 is a graph showing channel estimations with and without linear prediction.

FIG. 8 is a graph showing channel estimations with and without linear prediction. The linear prediction, such as may be performed by the channel tracker 22, 42 shown in FIGS. 1 and 2, respectively, was implemented with respect to time. A comparison of a bit error rate (BER) to a signal-to-noise ratio (SNR) for various channel estimations is shown in FIG. 8 including a DD-LMS channel estimation 74 at 80 kbh, a DD-LMS channel estimation 76 at 40 kbh, a DD-LMS channel estimation with LP 78 at 80 kbh, and a DD-LMS channel estimation with LP 80 at 40 kph. A lower BER and high SNR are generally desirable features for a channel estimation. As best shown in FIG. 8, the DD-LMS channel estimations with LP (78, 80) have lower BER and higher SNR than the corresponding DD-LMS channel estimations (74, 76).

Figure 9:
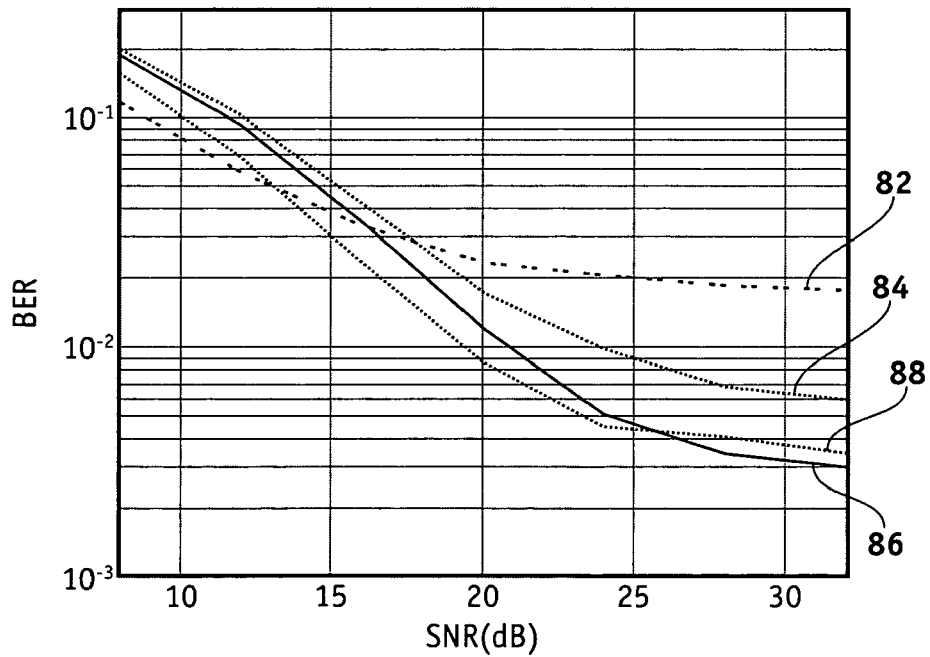
FIG. 9 is a graph showing channel estimations with various linear prediction orders.

FIG. 9 is a graph showing channel estimations with various linear prediction orders, such as may be performed by the channel tracker 22, 42 shown in FIGS. 1 and 2, respectively. A comparison of BER to SNR for various linear predictions orders is shown in FIG. 9 including a channel estimation without linear prediction 82, a channel estimation with second order linear prediction (LP2) 84, a channel estimation with third order linear prediction (LP3) 86, and a channel estimation with fourth order linear prediction (LP4) 88. As best shown in FIG. 8, the BER and SNR generally improve for channel estimations having progressively higher order linear prediction.

Figure 10:
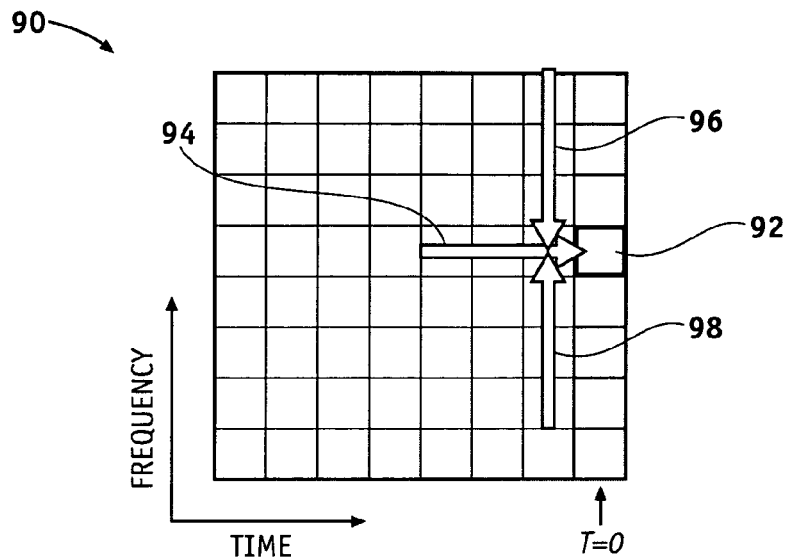
FIG. 10 is a graph showing a first exemplary embodiment of linear prediction in accordance with the present invention.

FIG. 10 is a graph showing a first exemplary embodiment of a linear prediction 90 in accordance with the present invention. As previously mentioned hereinabove, a mobile communication channel may be time and frequency selective. For purposes of channel estimation, the communication channel may be analyzed by estimating a channel 92 at a selected time point and a selected frequency (e.g., time and frequency pixel) based upon one or more sample time points and/or frequencies. For example, the linear prediction 90, such as may be performed by the channel tracker 22, 42 shown in FIGS. 1 and 2, may be based upon adjacent or a series of adjacent sample time points and/or frequencies. A single dimensional linear prediction, such as shown in FIG. 7, may be based upon:

$$\hat{h}_n = \sum_{p=1}^{P} -a_{p+1} \hat{h}_{n-p}$$

where $\hat{h}_n$ represents a one step predictor for the communication channel at a time sample n, P is a linear prediction order, and a is a linear prediction coefficient. The linear prediction coefficients, a, were determined by solving a Yule-Walker equation with Levinson-Durbin recursion.

Linear predictions based on a multi-dimensional time-frequency plane may also be used. In the first exemplary embodiment shown in FIG. 9, the linear prediction 90 has three components: a time prediction 94, a high-to-low frequency prediction 96, and a low-to-high frequency prediction 98. The time prediction 94 is based on an adjacent sample time point or a series of adjacent sample time points that occur prior to the time point of the channel 92 to be estimated. Each of the sample time points has a sample frequency that is substantially the same as the selected frequency of the channel 92 to be estimated. The time prediction 94 estimates the channel 92 by approaching the channel 92 along the time axis.

The high-to-low frequency prediction 96 is based on an adjacent sample frequency or a series of adjacent sample frequencies that are each of a higher frequency than the selected frequency of the channel 92 to be estimated. Each of the sample frequencies of the high-to-low prediction 96 has a sample time point that is substantially the same as the selected time point of channel 92 to be estimated. The high-to-low frequency prediction 96 estimates the channel 92 by approaching the channel 92 along the frequency axis from a direction of higher frequency to lower frequency.

The low-to-high frequency prediction 98 is based on an adjacent sample frequency or a series of adjacent sample frequencies that are each of a lower frequency than the selected frequency of the channel 92 to be estimated. Each of the sample frequencies of the low-to-high prediction 98 has a sample time point that is substantially the same as the selected time point of the channel 92 to be estimated. The low-to-high frequency prediction 98 estimates the channel 92 by approaching the channel 92 along the frequency axis from a direction of lower frequency to higher frequency.

The time prediction 94, high-to-low frequency prediction 96, and low-to-high frequency prediction 98 are combined to produce the linear prediction 90 and may be represented by the following:

$$\hat{h}_{i,j}^{t^+} = \sum_{pt^+=1}^{PT^+} -a_{pt^++1,j}^{pt^+} \times \hat{h}_{i-pt^+,j};$$

$$\hat{h}_{i,j}^{f^+} = \sum_{pf^+=1}^{PF^+} -a_{i,pf^++1}^{pf^+} \times \hat{h}_{i-1,j-pf^+};$$

$$\hat{h}_{i,j}^{f^-} = \sum_{pf^-=1}^{PF^-} -a_{i,pf^-+1}^{pf^-} \times \hat{h}_{i-1,j+pf^-};$$

wherein $\hat{h}_{i,j}^{t^+}$ represents the time prediction 94, $\hat{h}_{i,j}^{f^+}$ represents the low-to-high frequency prediction 98, $\hat{h}_{i,j}^{f^-}$ represents the high-to-low frequency linear prediction 96, i is a time index, j is a frequency index, and each of $a_{i,j}^{pt^+}$, $a_{i,j}^{pf^+}$ and $a_{i,j}^{pf^-}$ is a linear prediction coefficient corresponding to the time prediction 94, low-to-high frequency prediction 98, and high-to-low frequency prediction 96, respectively.

The foregoing three components of the linear prediction 90 may be combined by using a linear sum such as $$\hat{h}_{i,j} = a\hat{h}_{i,j}^{t^+} + b\hat{h}_{i,j}^{f^+} + c\hat{h}_{i,j}^{f^-},$$

where the sum of a, b, and c is one. One example is to set a=b=c=⅓, but other weighting methods for determining values of a, b, and c may be used, such as adjusting the values based on statistics of the channel estimate. For example, if one of the components of the linear prediction 90 were determined to vary statistically to a greater extent than the other components, the weighting for such component may be correspondingly reduced. Other combinations of the three components may also be used including, but not limited to, a median value of the three components for a non-linear operation. The three sets of linear prediction coefficients, $a_{i,j}^{pt^+}$, $a_{i,j}^{pf^+}$ and $a_{i,j}^{pf^-}$, may be determined using the Yule-Walker equation with Levinson-Durbin recursion.

Figure 11:
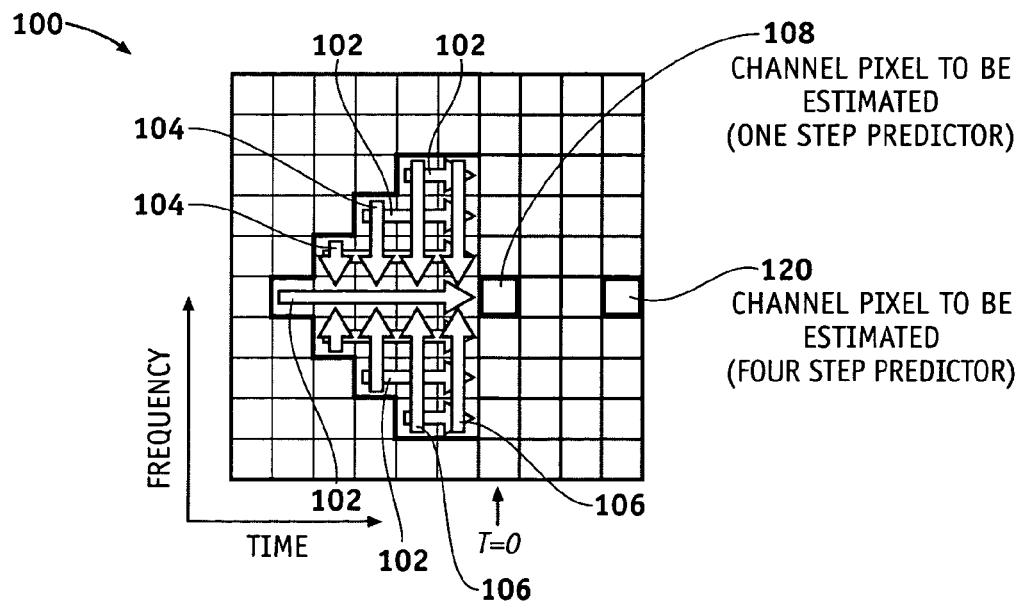
FIG. 11 is a graph showing a second exemplary embodiment of linear prediction in accordance with the present invention.

FIG. 11 is a graph showing a second exemplary embodiment of a linear prediction 100 in accordance with the present invention. In this exemplary embodiment, the linear prediction 100, such as may be performed by the channel tracker 22, 42 shown in FIGS. 1 and 2, respectively, is shown having multiple sets of components: a set of time predictions 102; a set of high-to-low frequency predictions 104; and, a set of low-to-high frequency predictions 106. The set of time predictions 102 is based on multiple sample time points or multiple series of sample time points that occur prior to the selected time point of a channel 108 to be estimated. Each sample time point, or series of sample time points, has a different sample frequency associated therewith that is substantially adjacent to the selected frequency of the channel 108 to be estimated. The set of time predictions 102 approach the selected time point of the channel 108 to be estimated along the associated sample frequency.

The set of high-to-low frequency predictions 104 is based on multiple sample frequencies or multiple series of sample frequencies that are each of a higher frequency than the selected frequency of the channel 108 to be estimated. Each of the sample frequencies, or series of sample frequencies, of the set of high-to-low frequency predictions has a sample time point occurring prior to the selected time point of the channel 108 to be estimated. The set of high-to-low frequency predictions 104 approaches the selected frequency of the channel 108 to be estimated along the associated sample time point.

The set of low-to-high frequency predictions 106 is based on multiple sample frequencies or multiple series of sample frequencies that are each of a lower frequency than the selected frequency of the channel 108 to be estimated. Each of the sample frequencies, or series of sample frequencies, has a sample time point occurring prior to the selected time point of the channel 108 to be estimated. The set of low-to-high frequency predictions 106 approaches the selected frequency of the channel 108 to be estimated along the associated sample time point. Although not presented herein, the combination of the set of time predictions 102, set of high-to-low frequency predictions 104, and set of low-to-high frequency predictions 106 and the linear prediction equations for the same may be derived from the equations described hereinabove regarding the first exemplary embodiment of the linear prediction 90 shown in FIG. 10 as appreciated by those of skill in the art.

Figure 12:
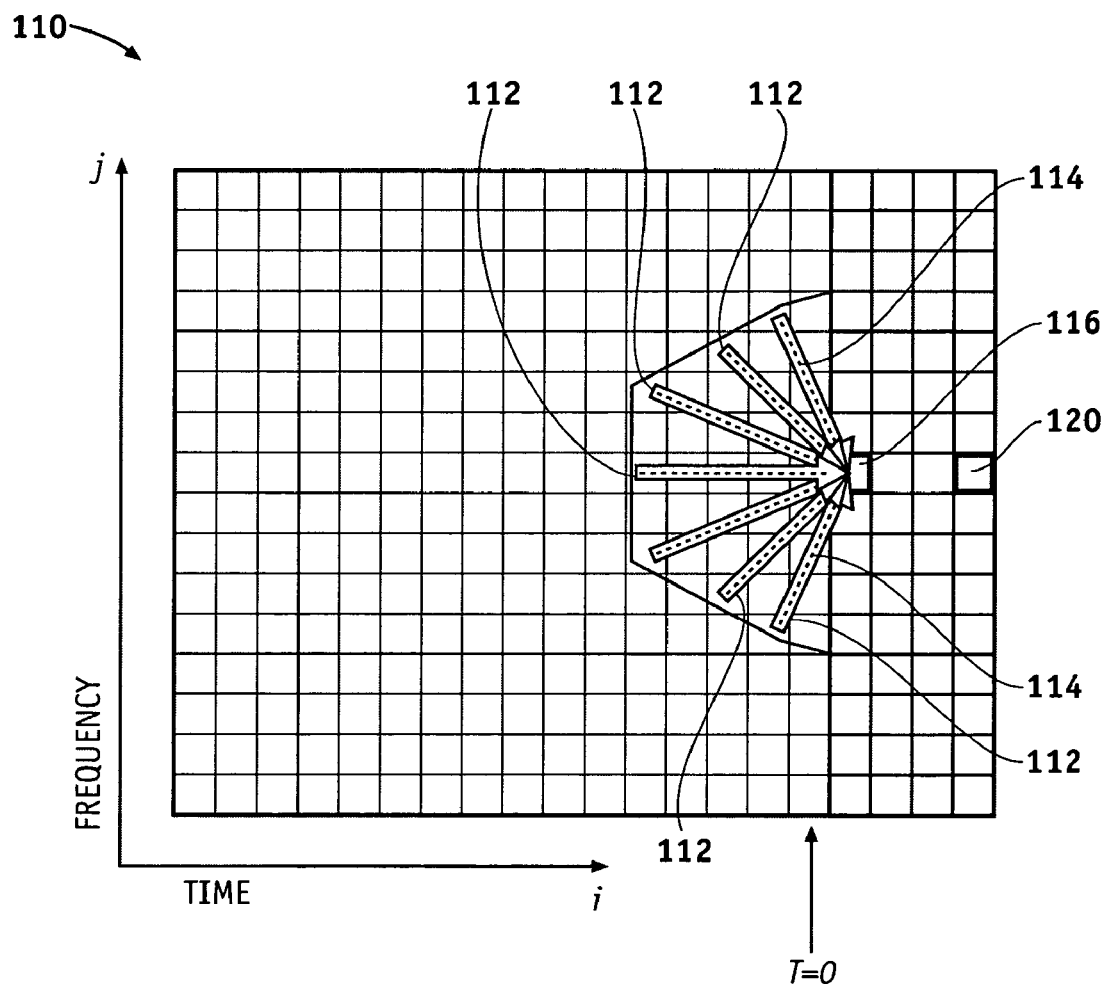
FIG. 12 is a graph showing a third exemplary embodiment of linear prediction in accordance with the present invention.

FIG. 12 is a graph showing a third exemplary embodiment of a linear prediction 110 in accordance with the present invention. In this exemplary embodiment, the linear prediction 110, such as may be performed by the channel tracker 22, 42 shown in FIGS. 1 and 2, respectively, has multiple components 111 where each component is based on multiple sample points 114 or multiple series of sample points 114. Each sample point 114 has a time point and a frequency associated therewith, and each sample point 114 or series of sample points is aligned with a time and frequency vector 112 that is directed to the selected time point and selected frequency of a channel 116 to be estimated as best shown in FIG. 12. Each of the components 111 approaches the channel to be estimated along the corresponding time and frequency vector 112. Although not presented herein, the combination of the multiple components 111 and the linear prediction equations for the same may be derived from the equations described hereinabove regarding the first exemplary embodiment of the linear prediction 90 shown in FIG. 9 as appreciated by those of skill in the art.

Although linear prediction has been described in the context of the foregoing exemplary embodiments, other variations of linear predication may be used. The sample points may be selected to more accurately predict the channel. Generally, the closer the sample point is to the channel to be estimated, the more accurate the estimation. In each of the exemplary embodiments of linear prediction described hereinabove, the channel to be estimated is substantially adjacent to the sample points. The linear prediction algorithms may also be used to predict channels 120 (FIGS. 11 and 12) that are more remote from the sample time points, such as four time steps in advance. In general, the closer the channel, to be estimated, is to the sample points, the more accurate the estimation.

Real-time communication systems may exhibit time and frequency varying channel statistics. Adaptive linear prediction techniques may be used that adjust automatically to changing channel conditions. For example, using LMS as the adaptive algorithm:

$$\varepsilon = \hat{h}_k - \sum_{p=1}^{P} -a_{p+1} \hat{h}_{k-p}; \text{ and,}$$

$$a_k = a_{k-1} + \mu \hat{h}_k \varepsilon.$$

Other adaptive algorithms such as RLS, the Kalman filter, and the like, may be used. Convergence and accuracy may be enhanced using a cascade adaptive linear predictor structure.

The invented apparatus presents significant benefits that would be apparent to one of ordinary skill in the art. While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A communication channel processing apparatus comprising:

a plurality of antennas/downconverters, wherein each antenna/downconverter of the plurality of antennas/downconverters includes an antenna configured to receive an input communication signal, and a downconverter, coupled to the antenna, and configured to generate a digitized downconverted signal from the input communication signal, and to determine a receive vector for the antenna by performing successive interference cancellation based on the digitized downconverted signal, a transmitter symbol estimate, and an estimated time-frequency channel for the antenna;

a plurality of receive channel transformers, coupled to the plurality of antennas/downconverters, wherein a first receive channel transformer of the plurality of receive channel transformers is configured to receive the digitized downconverted signal from each of the plurality of antennas/downconverters and to perform spatial filtering and demodulation to obtain a first data estimate for a first receive vector and to remodulate the first data estimate to obtain the transmitter symbol estimate, and a second receive channel transformer of the plurality of receive channel transformers is configured to receive the receive vector from each of the plurality of antennas/downconverters and to perform spatial filtering and demodulation to obtain a second data estimate for a second receive vector; and a channel tracker having a channel estimator and a linear predictor, and configured to produce the estimated time-frequency channel for each of the plurality of antennas/downconverters based on the transmitter symbol estimate from the first receive channel transformer and channel information of time frames prior to a channel to be estimated.

2. A communication channel processing apparatus according to claim 1, wherein said channel tracker uses a channel estimation method selected from a least square (LS) filter, a least mean square (LMS) filter, a recursive least squares (RLS) filter, and a Kalman filter.

3. A communication channel processing apparatus according to claim 1, wherein said linear predictor includes a cascade adaptive linear predictor structure.

4. A signal processor comprising:

a channel estimator configured to generate a first channel estimation at a first time point; and a linear predictor coupled to said channel estimator, said linear predictor configured to predict a second channel estimation based on a time sample and a channel frequency, said second channel estimation subsequent to said first channel estimation and based on $$\hat{h}_n = \sum_{p=1}^{P} -a_{p+1}\hat{h}_{n-p},$$

wherein $\hat{h}_n$ is a one step predictor for a channel at time sample n, P is a linear prediction order, and a is a linear prediction coefficient, and wherein said linear predictor is further configured to predict said second channel estimation based on $$\hat{h}_{i,j}^{t^+} = \sum_{pt^+=1}^{PT^+} -a_{pt^++1,j}^{pt^+} \times \hat{h}_{i-pt^+,j}$$

$$\hat{h}_{i,j}^{f^+} = \sum_{pf^+=1}^{PF^+} -a_{i,pf^++1}^{pf^+} \times \hat{h}_{i-1,j-pf^+}$$

$$\hat{h}_{i,j}^{f^-} = \sum_{pf^-=1}^{PF^-} -a_{i,pf^-+1}^{pf^-} \times \hat{h}_{i-1,j+pf^-};$$

wherein $\hat{h}_{i,j}^{t^+}$ a forward time linear predictor, $\hat{h}_{i,j}^{f^+}$ is a low-to-high frequency linear predictor, $\hat{h}_{i,j}^{f^-}$ is a high-to-low frequency linear predictor, i is a time index, j is a frequency index, and each of $a_{i,j}^{pt^+}$, $a_{i,j}^{pf^+}$ and $a_{i,j}^{pf^-}$ is a linear prediction coefficient.

5. A signal processor according to claim 4, wherein said linear prediction coefficients are determined using a Yule-Walker equation with a Levinson-Durbin recursion.

6. A signal processor according to claim 4, wherein said linear prediction coefficients are determined using an adaptive algorithm selected from least mean square (LMS), recursive least square (RLS), and a Kalman filter.

7. A radio receiver comprising:
a plurality of antennas/downconverters, wherein each antenna/downconverter of the plurality of antennas/downconverters includes
an antenna configured to receive an input communication signal, and
a downconverter, coupled to the antenna, and configured to generate a digitized downconverted signal from the input communication signal, and to determine a receive vector for the antenna by performing successive interference cancellation based on the digitized downconverted signal, a transmitter symbol estimate, and an estimated time-frequency channel for the antenna;
a plurality of receive channel transformers, coupled to the plurality of antennas/downconverters, wherein a first receive channel transformer of the plurality of receive channel transformers is configured to receive the digitized downconverted signal from each of the plurality of antennas/downconverters and to perform spatial filtering and demodulation to obtain a first data estimate for a first receive vector and to remodulate the first data estimate to obtain the transmitter symbol estimate, and a second receive channel transformer of the plurality of receive channel transformers is configured to receive the receive vector from each of the plurality of antennas/downconverters and to perform spatial filtering and demodulation to obtain a second data estimate for a second receive vector; and
a channel tracker having a channel estimator and a linear predictor, and configured to produce the estimated time-frequency channel for each of the plurality of antennas/downconverters based on the transmitter symbol estimate from the first receive channel transformer and channel information of time frames prior to a channel to be estimated.

8. A radio receiver according to claim 7, wherein said channel tracker uses a channel estimation method selected from a least square (LS) filter, a least mean square (LMS) filter, a recursive least squares (RLS) filter, and a Kalman filter.

* * * * *